(12) United States Patent  
Salter et al.

(10) Patent No.: US 8,162,519 B2  
(45) Date of Patent: Apr. 24, 2012

(54) CONCEALED INTERIOR LIGHTING FOR AUTOMOBILES

(75) Inventors: Stuart C. Salter, White Lake, MI (US); Cornel Lewis Gardner, Romulus, MI (US); Mike James Whitens, Novi, MI (US); Jeffrey Singer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 12/390,495

(22) Filed: Feb. 22, 2009

(65) Prior Publication Data

US 2010/0214795 A1    Aug. 26, 2010

(51) Int. Cl.  
*B60Q 1/00*    (2006.01)

(52) U.S. Cl. .......................... 362/488; 362/490; 362/511

(58) Field of Classification Search .................. 362/482, 362/483, 488, 489, 490, 492, 501, 511, 545, 362/554, 555  
See application file for complete search history.

(56) References Cited

U.S. PATENT DOCUMENTS

| | | | |
|---|---|---|---|
| 5,136,485 A * | 8/1992 | Muller | 362/488 |
| 6,464,381 B2 * | 10/2002 | Anderson et al. | 362/490 |
| 6,974,238 B2 | 12/2005 | Sturt | 362/488 |
| 7,121,702 B2 * | 10/2006 | Muller | 362/511 |
| 7,938,566 B2 * | 5/2011 | Ishida et al. | 362/488 |
| 8,016,465 B2 * | 9/2011 | Egerer et al. | 362/489 |
| 2004/0017687 A1 | 1/2004 | Misaras | 362/489 |
| 2005/0281041 A1 * | 12/2005 | Kaphengst et al. | 362/492 |
| 2007/0035958 A1 * | 2/2007 | Mueller et al. | 362/488 |
| 2007/0047246 A1 | 3/2007 | Barowski | 362/488 |
| 2007/0153535 A1 * | 7/2007 | Bostick | 362/488 |
| 2007/0160334 A1 | 7/2007 | Cobb | 385/116 |

* cited by examiner

*Primary Examiner* — Y My Quach Lee  
(74) *Attorney, Agent, or Firm* — Greg Brown, Esq.; Miller Law Group, PLLC

(57) ABSTRACT

A lighting arrangement for the interior of an automotive vehicle in which the light source, such as an LED, is recessed into the interior structure of the vehicle and covered with a layer of fabric. The light source is invisible when not in use, but shines through the fabric/foam layer when illuminated, and can be associated with a light transmitting member, such as a light bar and a light pipe. Such lighting arrangements can be disposed within the headliner to direct light where desired and for different functions, such as a map light or for area lighting. The lighting arrangement can be mounted in non-traditional locations, such as on vertically oriented pillars, visors, door panels, seat backs, seat fronts, and console sides. The light source is preferably one or more LEDs associated with a light transmitting medium to direct the discharge of light as desired within the automotive interior.

8 Claims, 9 Drawing Sheets

CONCEALED INTERIOR LIGHTING FOR AUTOMOBILES

FIELD OF THE INVENTION

This invention relates to the lighting arrangement for the interior passenger compartment of an automotive vehicle and, more particularly, to a lighting arrangement in which LED lighting is concealed behind a layer of fabric within the interior surfaces of the automotive passenger compartment.

BACKGROUND OF THE INVENTION

Purchasers of automobiles are known to prefer vehicle exteriors with hidden or concealed light sources as a distinguishing decorative appearance for the vehicle. Accordingly, the use of concealed interior lighting may also prove to be a desirable decorative feature. Styling efforts for vehicle interiors have traditionally worked around various lighting sources, such as the roof dome light and trim mounted reading or map lights. Such styling constraints limit the appearance that may be achieved and, as a result, constrains the customer satisfaction with the interior styling.

Hiding the light sources within the interior would remove the constraints on the styling efforts and enable substantial changes in interior styling for automotive interiors. Previous attempts to hide the lighting sources have resulted in indirect lighting which has proven to be difficult to attain and often does not achieve appearance objectives. Preferably, the lighting source would be invisible to the customer when not illuminated, yet provide sufficient lighting to fulfill the intended function of the light source, i.e. reading lamp, a dome lamp, or an ambient lamp.

One example of indirect interior lighting for an automobile can be found in U.S. Pat. No. 6,974,238, granted on Dec. 13, 2005, to Alan Sturt, et al, in which light sources are hidden behind trim pieces within the interior of the passenger compartment to shine light through an opening associated with the arrangement of the interior trim pieces so that the light sources cannot be seen when illuminated. One substantial drawback with such indirect lighting schemes is the attainment of the lighting functions. In U.S. Patent Publication No. 2004/0017687 of David Misaras, published on Jan. 29, 2004, the outer skin of automotive trim is perforated to form openings therein or formed of translucent material to allow light to escape from behind the surface of the trim piece where a light source, such as an LED or a light pipe, is mounted. Such lighting arrangements are not invisible when not illuminated.

In U.S. Patent Publication No. 2007/0160334 of Weston Cobb, et al, published on Jul. 12, 2007, end-emitting fiber optic indicia are formed in the shape of a logo, letter, picture or other arrangement to provide a decorative feature for the interior of a motor vehicle using an LED as a remote light source. The illumination system disclosed in U.S. Patent Publication No. 2007/0047246 of Dieter Barowski, published on Mar. 1, 2007, also utilizes illumination units disposed within a gap at a location remote from the light distribution surface. An interior cover panel covers the illumination system.

It would be desirable to provide concealed lighting arrangements for the interior of an automotive passenger compartment in which the light source is recessed into the interior structure and hidden behind a layer of fabric and/or foam so that the light source is invisible when not illuminated, but able to provide sufficient lighting to fulfill the lighting requirements for the light source.

SUMMARY OF THE INVENTION

It is an object of this invention to overcome the aforementioned disadvantages of the known prior art by providing concealed interior lighting in which the light source is recessed into the interior structure and hidden behind a layer of fabric, foam and/or decorative film.

It is another object of this invention to provide a concealed interior lighting arrangement in which the light source shines through a layer of fabric, foam and/or decorative film to provide the intended lighting function for the interior of the automotive vehicle.

It is a feature of this invention that the light source is a low heat light source, such as an LED or flexible light pipe.

It is an advantage of this invention that the use of LED's and light pipes as the light source resolves any problems associated with heat from the light source.

It is another advantage of this invention that the light shining through a layer of fabric provides a unique interior appearance when the light source is illuminated at night.

It is another feature of this invention that the light can be as narrow as a pin point or as broad as substantially the entire headliner of the vehicle roof.

It is still another feature of this invention that the light pipes can be shaped into a desirable shape or configuration to provide visible designs, while providing light for the intended lighting function.

It is still another advantage of this invention that the no lights protrude from the interior surface of the vehicle.

It is yet another advantage of this invention that the lighting arrangement does not show a fixed cover member through which light is emitted to provide the desired lighting function.

It is yet another feature of this invention that the light sources can be packaged in non-traditional locations such as fabric covered inserts on door and trim panels, on seats and head rests, and in carpets visors and armrests without detracting from the appearance of the interior of the vehicle.

It is a further advantage of this invention that the use of LEDs and light pipes enables the utilization of different colors to provide a unique interior styling when the lights are illuminated.

It is a further feature of this invention that the concealment of the lighting for the interior of the automotive passenger compartment provides an opportunity for a smooth and sleek, refined appearance.

It is yet another object of this invention to provide a concealed interior lighting arrangement, which is durable in construction, inexpensive of manufacture, carefree of maintenance, facile in assemblage, and simple and effective in use.

These and other objects, features and advantages are accomplished according to the instant invention by providing a lighting arrangement for the interior of an automotive vehicle in which the light source, such as an LED, is recessed into the interior structure of the vehicle and covered with a layer of fabric. The light source is invisible when not in use, but shines through the fabric/foam layer when illuminated, and can be associated with a light transmitting member, such as a light bar and a light pipe. Such lighting arrangements can be disposed within the headliner to direct light where desired and for different functions, such as a map light or for area lighting. The lighting arrangement can be mounted in non-traditional locations, such as on vertically oriented pillars, visors, door panels, seat backs, seat fronts, console sides and floor carpet. The light source is preferably one or more LEDs associated with a light transmitting medium to direct the discharge of light as desired within the automotive interior.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
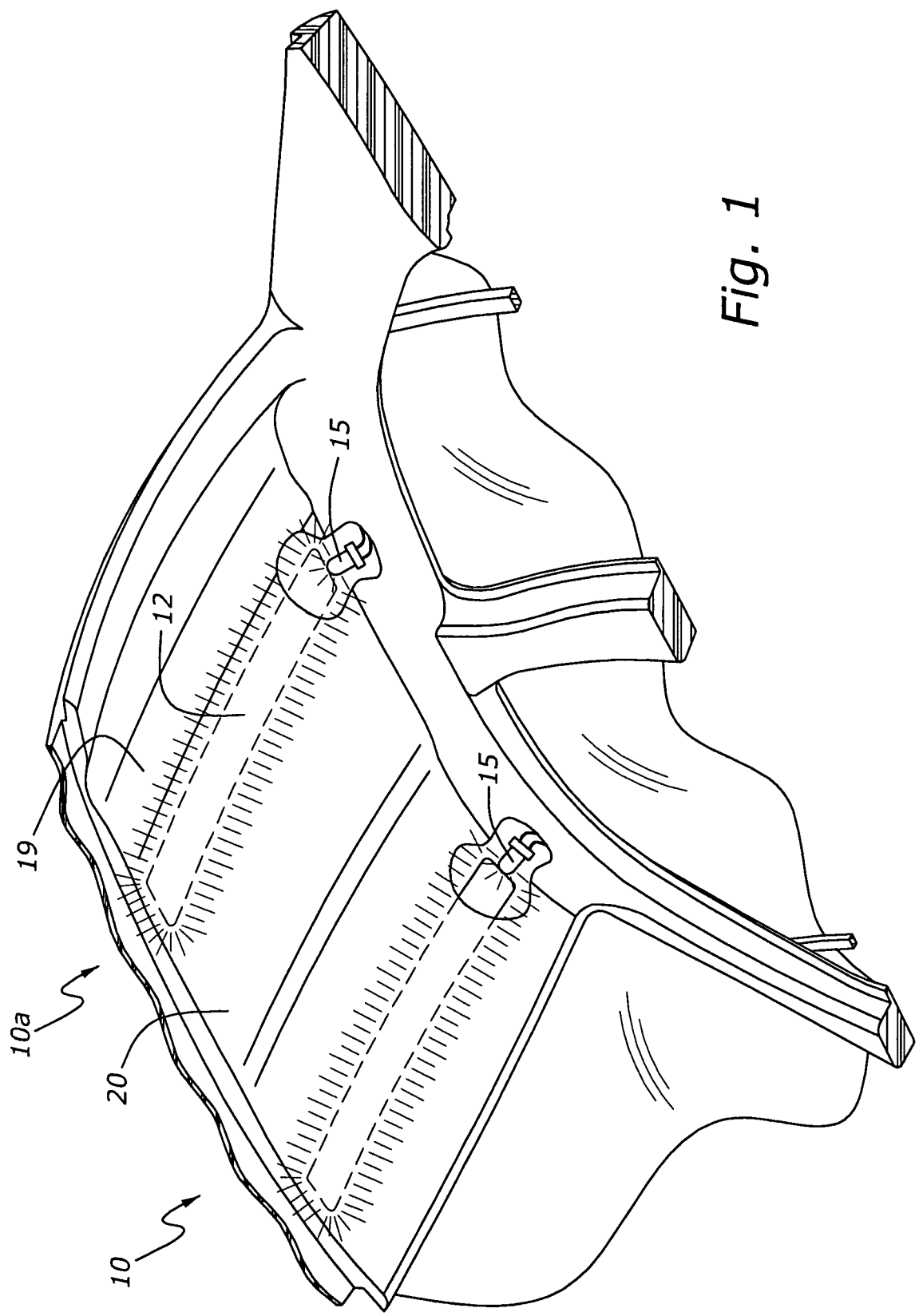
FIG. 1 is a partial schematic perspective view of the headliner forming the roof of an automotive interior having a lighting arrangement incorporating the principles of the instant invention.

Referring to the drawings, a lighting arrangement incorporating the principles of the instant invention can best be seen disposed within the interior structure of the automotive passenger compartment. The common trait shown in each of the embodiments of FIGS. 1-8 is that the lighting arrangement 10 is recessed into the substrate structure, such as foam padding, of the passenger compartment interior and covered with a layer of fabric or decorative film 19 such that the lighting arrangement 10 is completely concealed from sight, but operable to direct light into the desired manner when illuminated. The lighting arrangement 10 does not include a lens covering over the recessed light source, as a lens member would make the location of the lighting arrangement readily apparent. By directing the light transmission through the covering material, such as fabric or foam, the lighting arrangement 10 is completely invisible with not being illuminated. The lighting arrangement 10 can also be embedded or molded into the substrate structure 18, as is shown in FIGS. 11 and 12.

A light transmitting member, such as a light bar, light panel or light pipe, can be used to provide illumination over a specified area from one or more LED light sources. A light bar, light panel or light pipe is constructed by molding or extruding a clear plastic material having the property of transmitting light with very little loss. Typically the light transmitting member will have optics that are either laser etched or molded into the surface thereof to give the whole light bar or light panel a similar intensity, unless the fade out effect is desired and the laser etching can be eliminated. A light pipe could have a width of a quarter of an inch and a length of 18 inches. A light bar could also have a narrow width compared to the length of the light bar but be wider than the light pipe and could be several inches wide, whereas a light panel could have the same length as the light bar, but have a substantially greater width, twelve inches as an example. The only significant difference between a light bar and a light panel being the width of the member. A thin film panel can also be utilized, the difference compared to a light panel being the smaller thickness of the thin film panel. Each particular embodiment is described below with respect to FIGS. 1-8.

Figure 9:
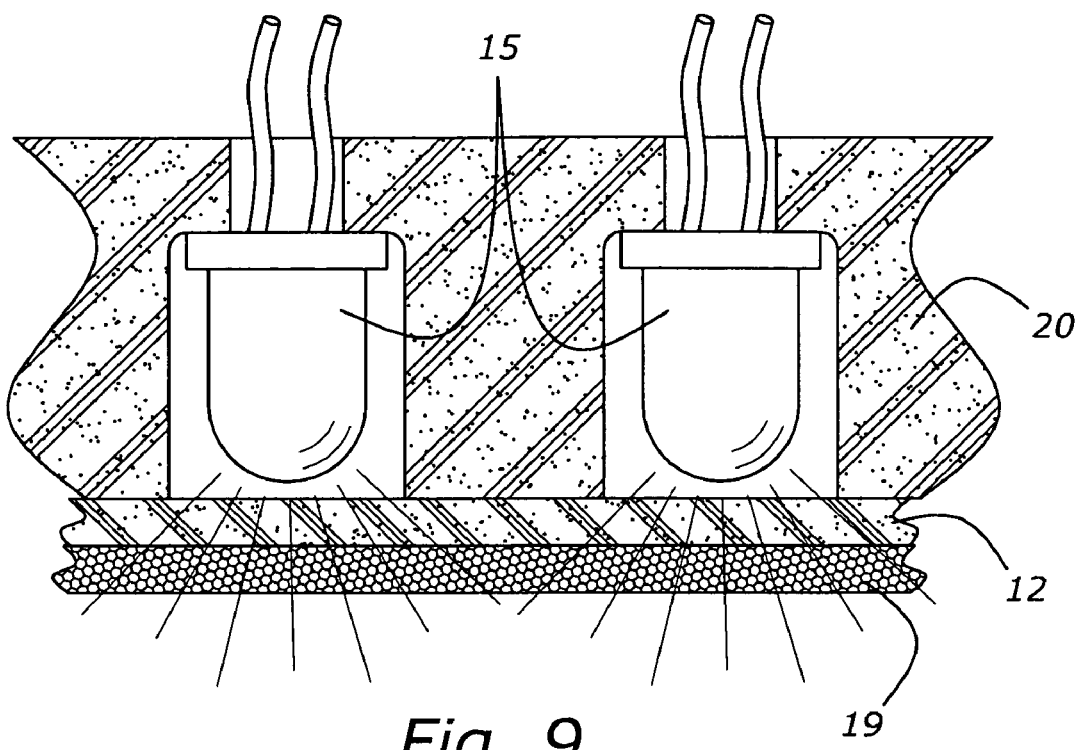
FIG. 9 is a partial cross-sectional view depicting the arrangement such as in FIGS. 1 and 2 where the light generated from LEDs is distributed by a light bar covered by a layer of fabric forming the interiormost surface of the arrangement.

In FIG. 1, the headliner 20 is depicted with a transverse light bar 12 recessed into the substrate of the headliner. In production, this embodiment would be attained by molding into the headliner substrate the light bar, light panel, or thin film panel. If the substrate panel material is more translucent, this allows manufacturing flexibility as to the depth of the light panel/bar/thin film placement within the substrate. If the substrate is opaque, a thin film panel would be molded onto the surface of the substrate, but underneath the face fabrics, as is generally depicted in FIGS. 9 and 12, so that the light bar or thin film panel 12 will direct light onto the front and rear seats, respectively. Similar methods can be utilized to embed light bars, light panels, or thin film panels in other interior vehicle components, such as door panels, floor, console, top finish panels, etc. The operation of the front and rear lighting arrangements 10, 10a can be controlled through separate switches (not shown) so that either lighting arrangement 10, 10a can be operated independently of the other. The LED 15 for each lighting arrangement 10, 10a, can be located at the side of the headliner 20 with the light bar 12 extending transversely therefrom. The light emanating from the respective light bars 12 will provide lighting in the manner of a dome light for the front and rear seats (not shown), respectively.

Figure 11:
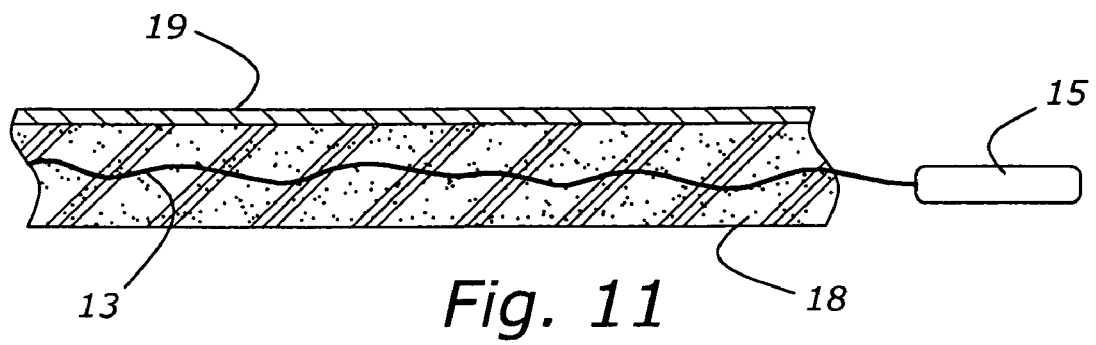
FIG. 11 is a partial cross-sectional view of a vehicle structure, such as a headliner, that includes a substrate structure covered by a fabric or foam material with the lighting member embedded into the substrate structure.
Figure 12:
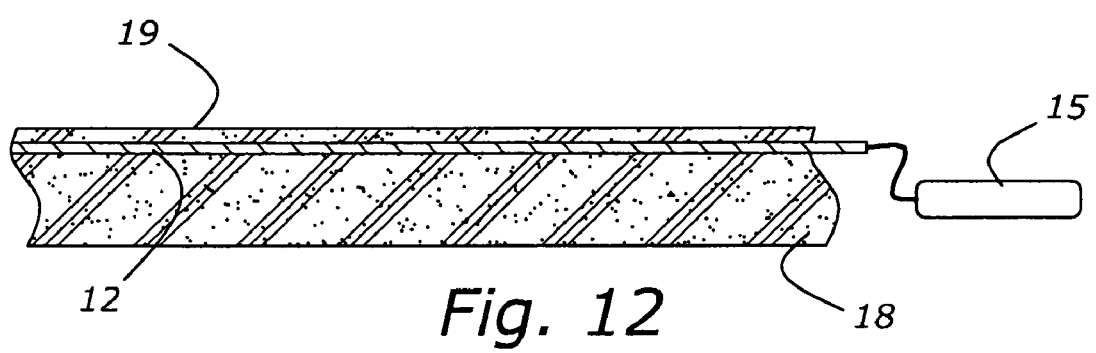
FIG. 12 is a partial cross-sectional view of a vehicle structure similar to that shown in FIG. 11, but with the lighting member being a thin film panel embedded or molded on the top surface of the substrate structure to transmit light through the fabric or foam covering material.

As is depicted in FIG. 11, the lighting member can be a fiber optic or light pipe 13 embedded into the substrate structure such that the light emanating therefrom powered by the light source 15 would pass through a part of a translucent substrate 18 and the face fabric layer 19. As depicted in FIG. 12, the lighting member can be a thin film panel 12 that is molded or embedded onto the top surface of the substrate 18. Powered by the light source 15, the light emanations would only pass through the face fabric layer 19 to cause an ambient illumination.

Figure 2:
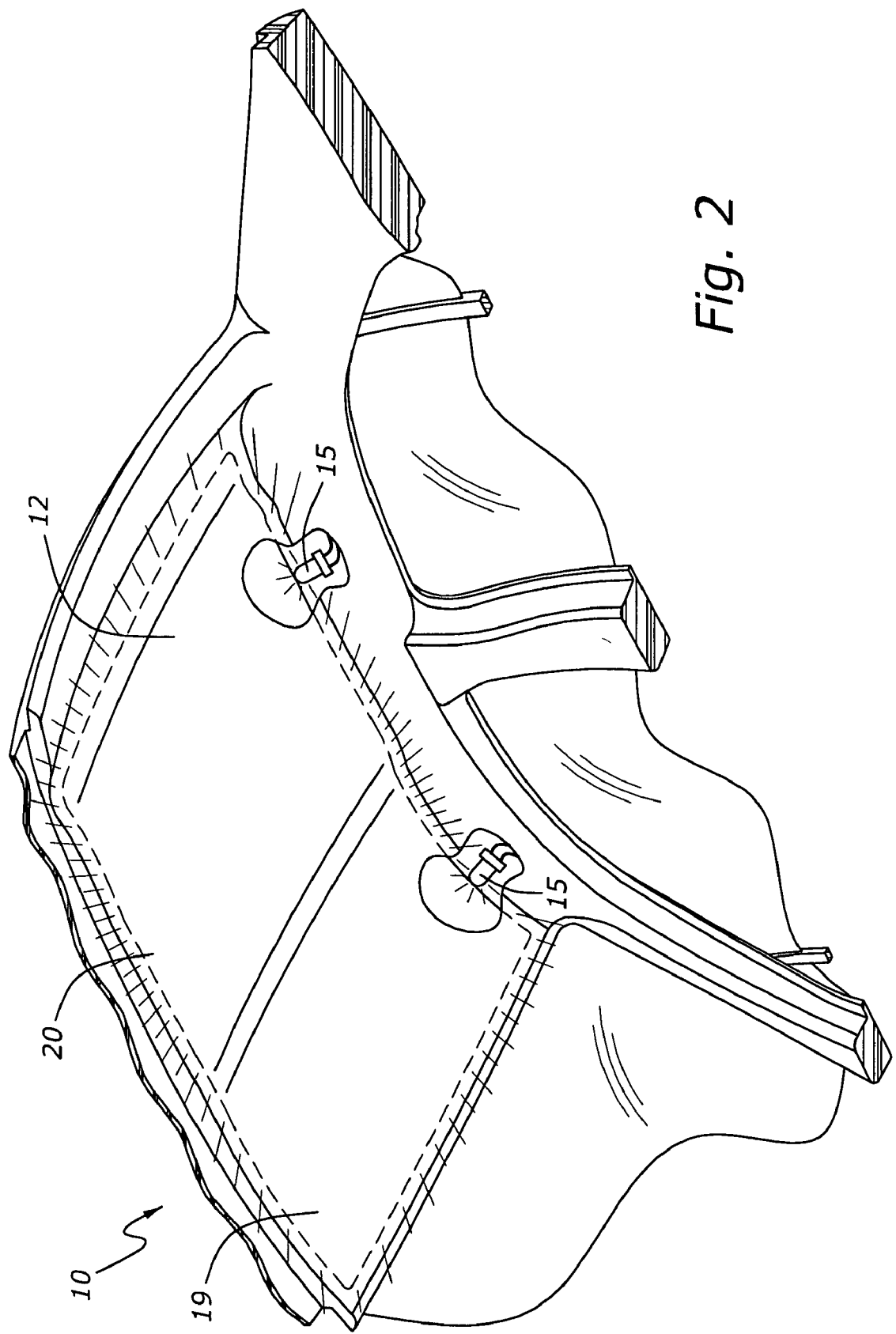
FIG. 2 is a partial schematic perspective view of the headliner depicted in FIG. 1 utilizing a second embodiment of a lighting arrangement incorporating the principles of the instant invention.

Similarly, in FIG. 2, the light bars 12 are arranged to cover substantially the entire interior surface of the headliner 20. Such an expansive light bar surface 12 will require at least a pair of LEDs 15 to provide sufficient light to function as a dome light, although with laser etching one large LED could be used with the incorporated optics to distribute the light evenly. As with the embodiment of FIG. 1, the LEDs 15 can be located to the side of the headliner 20, and can be located on both opposing sides of the headliner 20 to provide a greater amount of illumination. The longitudinally disposed LEDs 15 can be operatively controlled independently, but would or could be operated together by a remote switch (not shown) to provide a conventional dome light function. As shown in FIG. 9, and with lighting from the side of the panel, the LEDs 15 would be recessed into the structure of the headliner 20 while the light bar 12 is mounted onto or recessed into the substrate of the headliner 20 with the LED being mounted to the side of the light bar or panel with the interiormost layer of fabric or foam 19 covering the light bar 12 so that the light emanates through the fabric layer 19. Thus, the lighting arrangement 10 is invisible when not operating.

Figure 3:
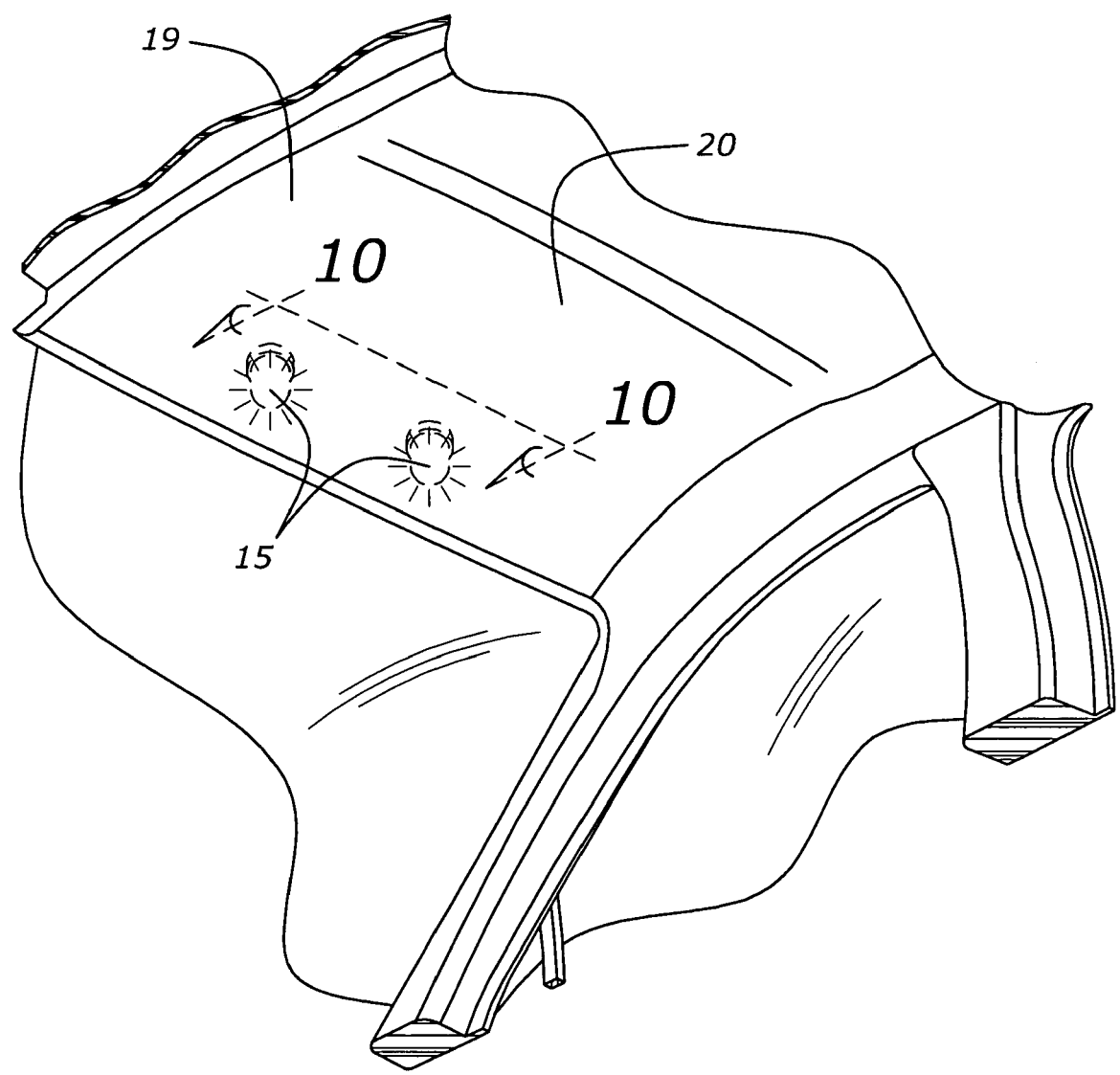
FIG. 3 is a partial schematic perspective view of a forward portion of the headliner forming the roof of an automotive interior having a lighting arrangement forming map lights for the front seat of the vehicle.
Figure 10:
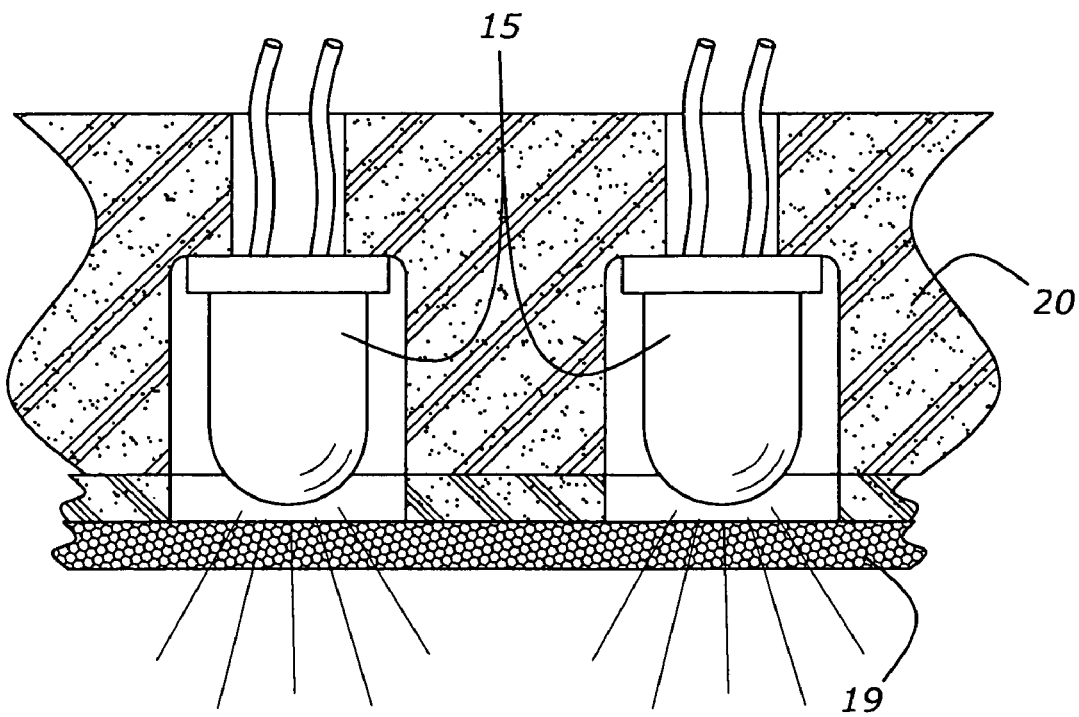
FIG. 10 is a partial cross-sectional view of the headliner taken along lines 10-10 of FIG. 3 to show the lighting arrangement where the LEDs shine light directly through the fabric layer to fulfill the lighting function for the map lights.

Individually operated LEDs 15 can be disposed at the forward end of the headliner 20, as is depicted in FIGS. 3 and 10. The LEDs 15 are recessed into the headliner substrate structure 20 and covered with a layer of fabric 19 to conceal the lighting arrangements 10 from view. The orientation and operation of the lighting arrangements 10 are such that the LEDs can function as map lights focused on respective driver and passenger sides of the passenger compartment. As with conventional map lighting for an automotive vehicle, the respective individual lighting arrangements 10 would be individually controlled through conveniently displayed switches, which may or may not be proximate to the switches controlling the lighting arrangements 10 on the headliner 20.

Either thick or thin fabric materials may be used to cover the concealed light arrangements 10. Thinner fabrics having a loose weave, or a larger hole size between the fibers, forming the fabric covering material are more efficient in transmitting light. However, thicker fabrics having a tighter weave, and correspondingly smaller hole sizes between the fibers, forming the fabric cover material may also be used by increasing the amount of light output from the LED to compensate for the less efficient transmission of light through the fabric. To achieve a required intensity and color in the vehicle the intensity of the LED light and color must be adjusted to compensate for the fabric/decorative film color, which can also cause color shift, and relative translucence.

Depending on the color of the fabric being utilized, the fabric can absorb varying amounts of specific frequencies of light. A RGB (Red/Green/Blue) LED light source can compensate for the color being absorbed by different colored fabrics by being driven to higher intensity for the red, green or blue frequencies. In the way of an example, if pure yellow is the intended light emanation in the vehicle and the fabric being utilized in the vehicle absorbs more red light than green light, the actual output color through this particular fabric would be a greenish yellow (the light emanation would be shifted toward green, as seen by occupants of the vehicle, not the pure yellow originally intended). Increasing the amount of red LED light being transmitted will affect a color compensation to return the net effect seen by occupants of the vehicle to pure yellow.

Figure 4:
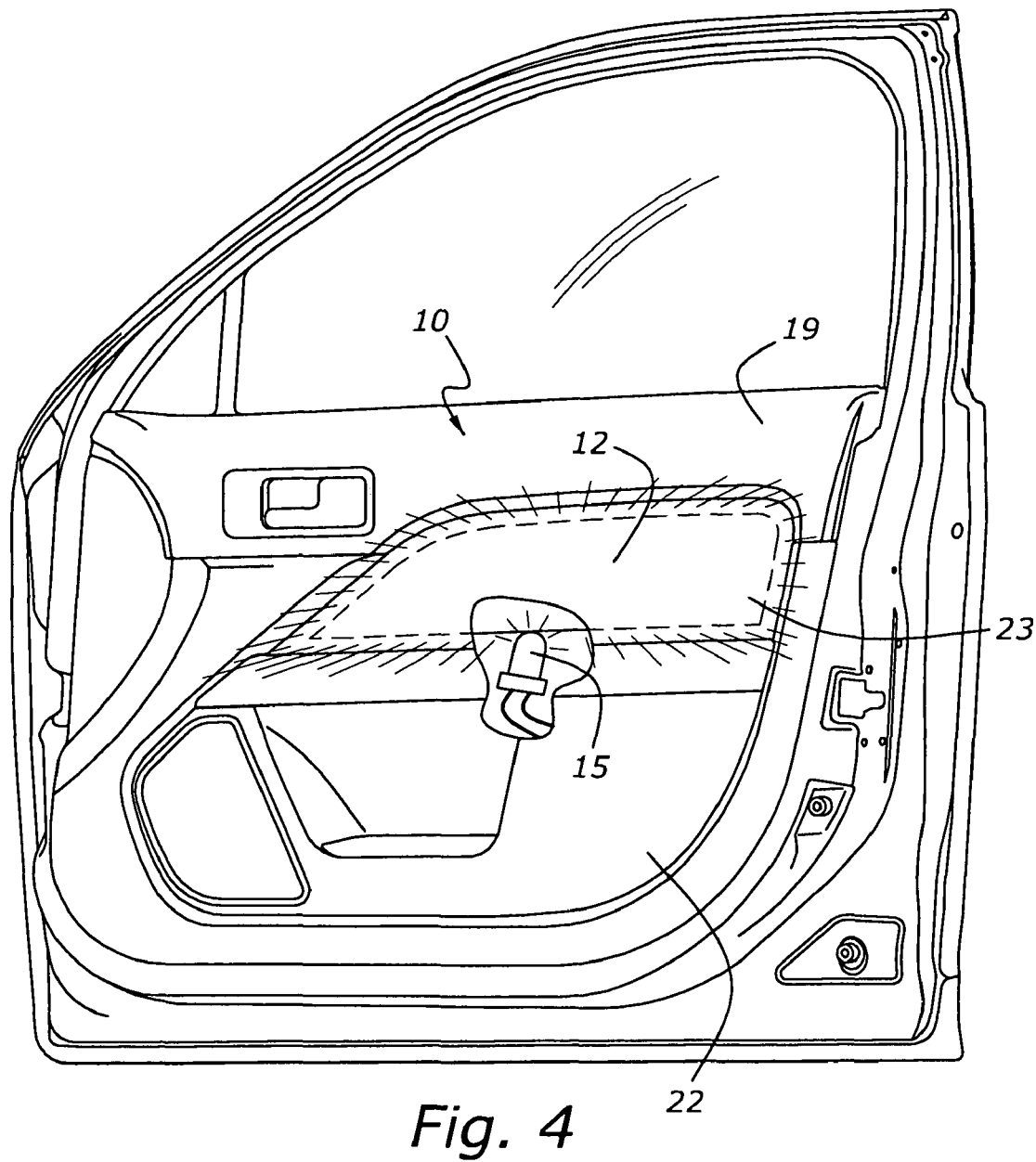
FIG. 4 is a schematic elevational view of the interior side of a door panel having a LED driven light bar incorporated therein.
Figure 13:
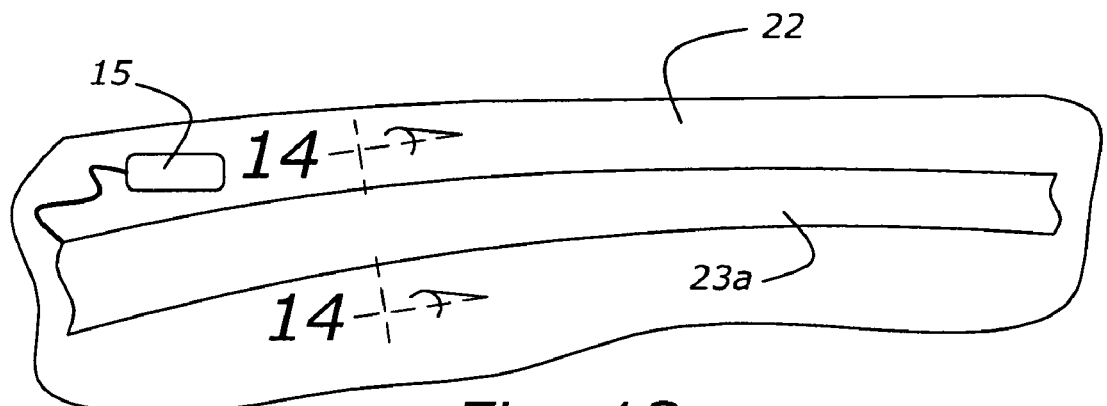
FIG. 13 is an elevational view of a portion of the interior surface of a vehicle door on which a molding member is mounted to incorporate the lighting member.
Figure 14:
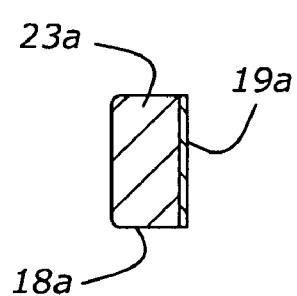
FIG. 14 is a cross-sectional view of the molding member taken along lines 14-14 of FIG. 13.

The provision of concealed lighting arrangements 10 utilizing LED powered light bars or light pipes can establish non-conventional lighting arrangements. One such non-conventional lighting arrangement 10 is depicted in FIG. 4 in which a central panel 23 of the interior surface of a door 22 can become an ambient light source. Instead of a light bar or panel 12, as is depicted in FIG. 4, the perimeter of the central panel 23 could have a light pipe recessed into the structure of the central panel 23 and covered with fabric as discussed above with respect to the headliner 20. The recessing can be accomplished through insert molding techniques and may or may not include the LED itself being molded into the assembly. Such lighting arrangement with a light pipe would primarily be a decorative accent. The on/off and even the intensity of the light arrangement 10 would preferably be controlled through appropriately positioned switches (not shown). An alternative arrangement is schematically depicted in FIGS. 13 and 14 wherein the lighting arrangement is in the form of a spear molding 23a applied to or embedded into the interior surface of the vehicle door 22. The spear molding 23a can incorporate a clear acrylic substrate 18a to transmit light from the LED source 15 through laser etched or molded optic features to provide a desired lighting display through the face cover layer 19a.

Figure 5:
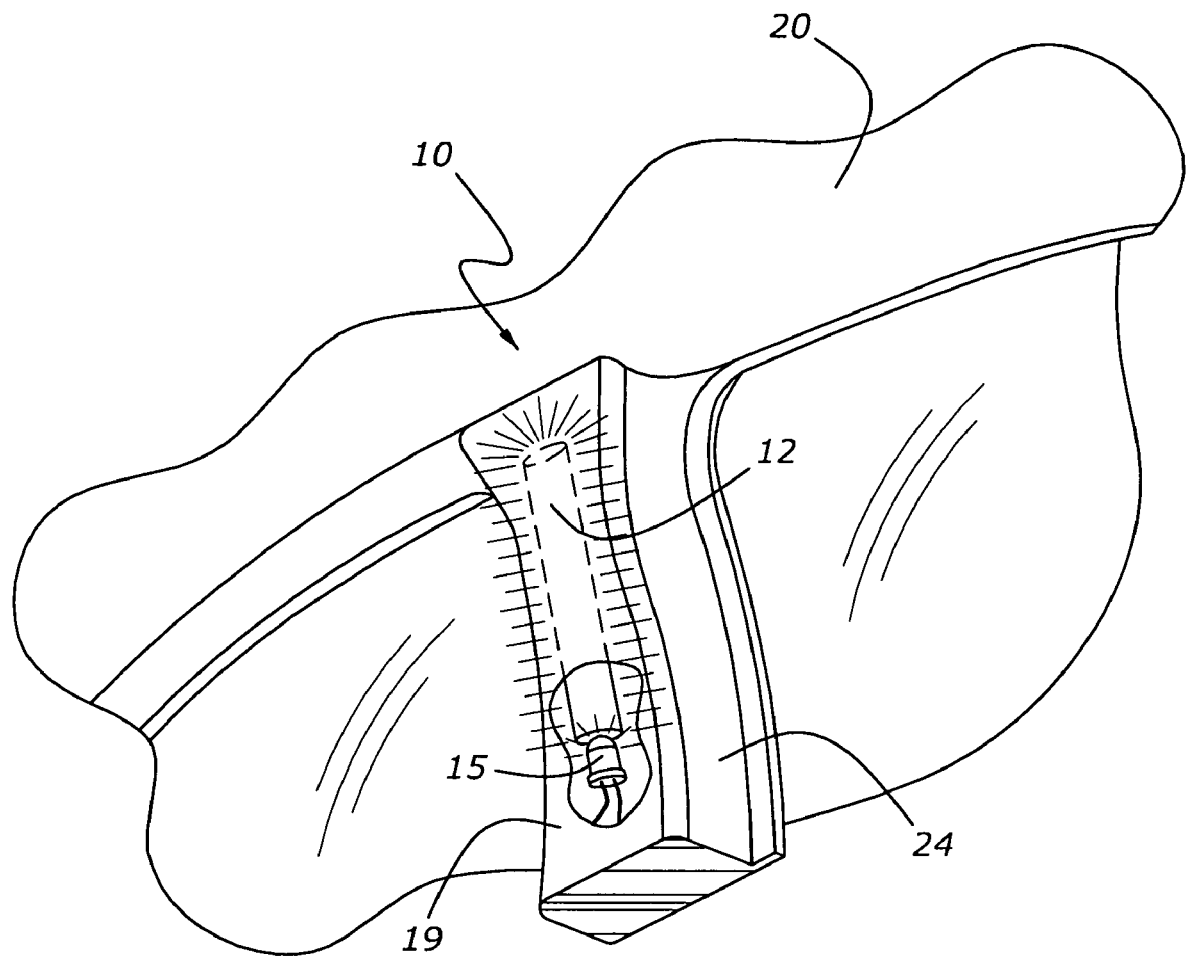
FIG. 5 is a partial schematic perspective view of the interior side of a support pillar, such as the B-pillar, incorporating a light bar driven by an LED to provide a lighting feature.

Another non-conventional lighting arrangement 10 is shown in FIG. 5 in which the soft structure of the interior of a roof support pillar 24, such as the A, B or C pillars, can house a recessed light arrangement 10 covered with a fabric/foam layer 19 as described above. Such lighting arrangement 10, like the door lighting arrangement of FIG. 4, can be used as an ambient light source or as a decorative accent. As described previously, a recessed LED 15 powers a light bar 12 that shines through the fabric/foam layer 19 covering the lighting arrangement 10.

Figure 6:
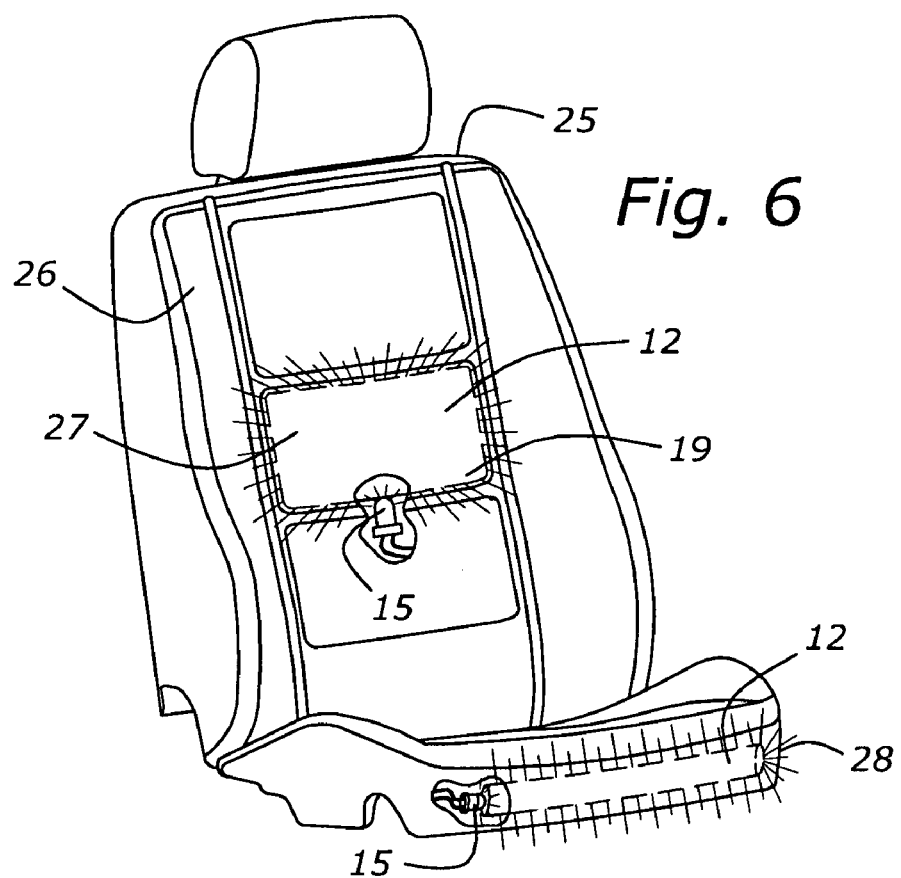
FIG. 6 is a partial schematic perspective view of a seat member in which the lighting arrangement has been mounted in the seat back and along the seat front to provide non-traditional lighting schemes for the interior of a automotive passenger compartment.
Figure 7:
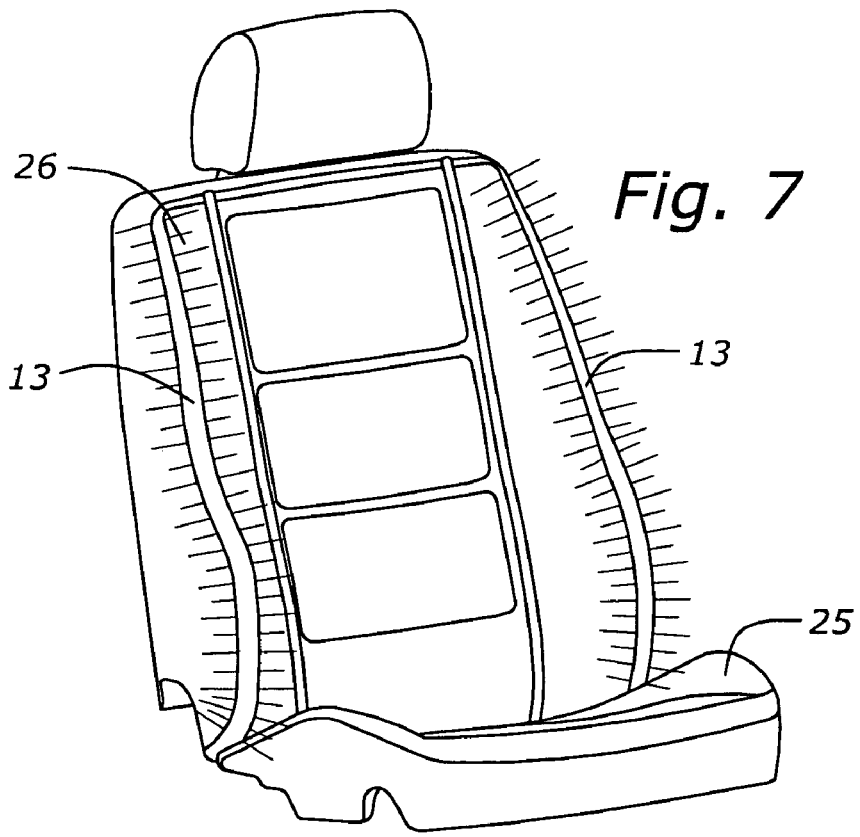
FIG. 7 is a partial schematic perspective view of a seat member in which the lighting arrangement has been mounted along the seat piping to provide additional non-traditional lighting schemes for the interior of a automotive passenger compartment.
Figure 8:
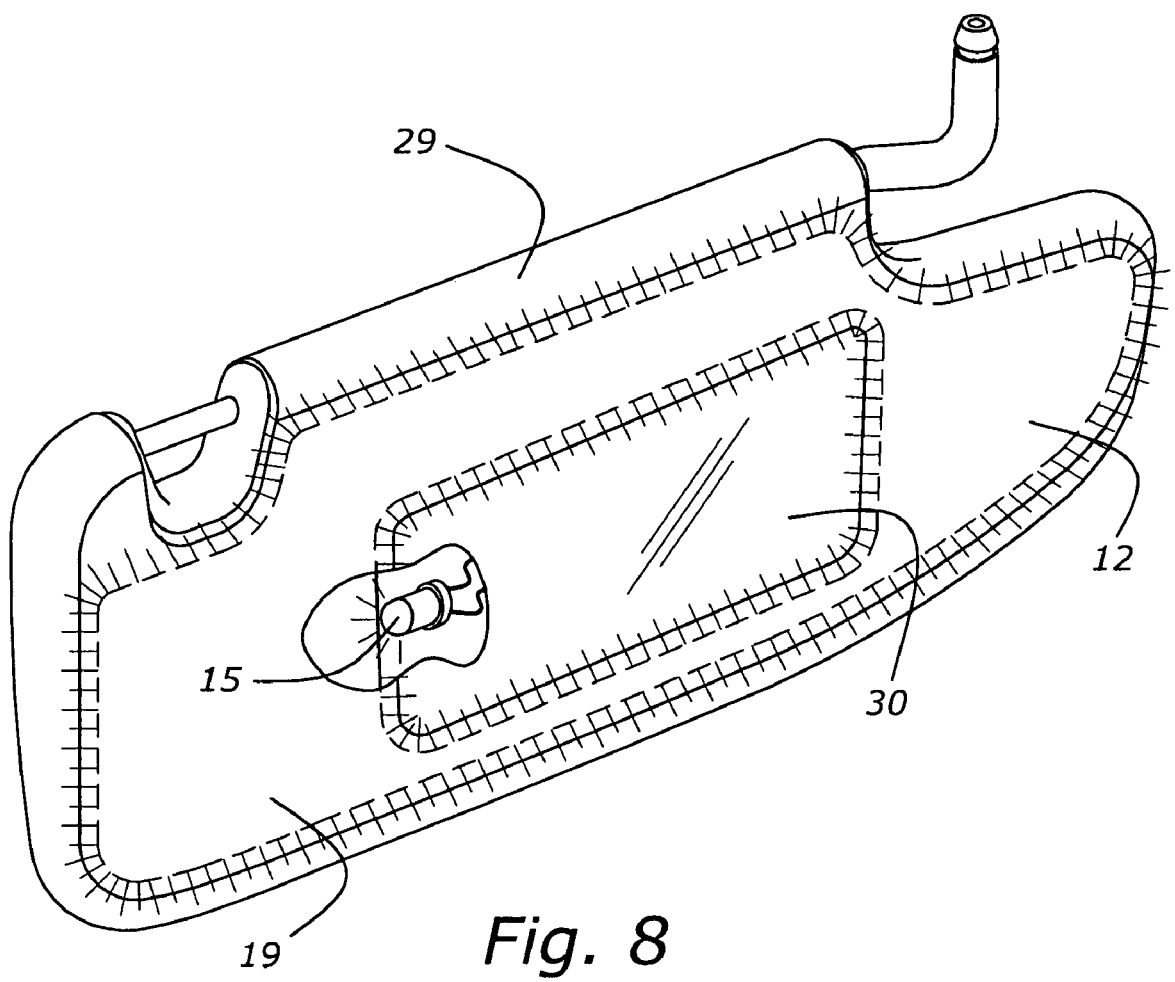
FIG. 8 is schematic perspective view of a visor incorporating light pipes to transmit light from an LED to provide another non-traditional lighting arrangement for the interior of an automotive passenger compartment.

The concealed lighting arrangements 10 can also be extended to other non-conventional lighting surfaces for decorative accents, such as the car seats 25 shown in FIGS. 6 and 7. In FIG. 6, the lighting arrangement 10 can be recessed into the seat back 26, such as in the central panel 27 of the seat back 26. A light bar 12 driven by a recessed LED 15 can illuminate the entire central panel 27 covered by a fabric layer 19 so as to be invisible unless illuminated. As with the door panel 23, the perimeter of the central panel 27 of the seat back 26 could have a light pipe recessed and driven by the LED 15 to provide a decorative accent when illuminated. In addition to the central panel 27, the front portion 28 of the seat 25 can have a light bar 12 recessed therein to provide a functional lighting of the floor area forwardly of the seat 25. The recessing of a light pipe 13 into the perimeter of the seat 25, as is depicted in FIG. 7, would provide a decorative accent for the seat 25.

Lighting arrangements 10 can also be recessed into the visor 29, preferably surrounding the mirror 30 that is typically mounted in the center of the visor 29. The shaped light bar 12 powered by the concealed LED 15 would provide functional lighting for the use of the mirror 30. The switch for operating the lighting arrangement 10 can be incorporated into a mirror cover (not shown) as is well known in the art. Accordingly, the lighting arrangement 10 would remain invisible when the mirror 30 is not in use and provide adequate illumination through the fabric layer 19 when the use of the mirror 30 is desired.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A lighting arrangement for interior surfaces of a passenger compartment of an automotive vehicle, said passenger compartment including a layer of substrate material and a layer of semi-opaque fabric cover material, comprising:
   a light emitting diode recessed into said substrate material and covered by said layer of semi-opaque fabric cover material so that said light emitting diode is not exposed on said interior surface and light emitted by said light emitting diode is transmitted into said passenger compartment through said layer of semi-opaque fabric cover material; and
   a light transmitting member operatively associated with said light emitting diode, said light transmitting member being covered by said layer of semi-opaque fabric cover material such that light emitting therefrom shines through said layer of semi-opaque fabric cover material into said passenger compartment.

2. The lighting arrangement of claim 1 wherein said light transmitting member is a light bar shaped to fit into a predefined area within said passenger compartment.

3. The lighting arrangement of claim 2 wherein said light bar is located on at least one of a roof headliner, a door panel, a visor, a seat, a console and a support pillar.

4. The lighting arrangement of claim 1 wherein said light transmitting member is a light pipe positioned around the perimeter of a predetermined area within said passenger compartment.

5. The lighting arrangement of claim 4 wherein said light pipe is affixed to at least one of a portion of a door panel, a portion of a seat and a portion of a visor.

6. The lighting arrangement of claim 1 wherein said light emitting diode is recessed into said substrate material in a roof headliner to shine light therefrom, when illuminated, through said layer of semi-opaque fabric cover material.

7. The automotive vehicle of claim 6 wherein said light transmitting member is one of a light bar, a light panel, a thin film panel and a light pipe.

8. The automotive vehicle of claim 6 wherein lighting arrangement is also located in at least one of a door panel, a visor, a seat, a console and a support pillar.

* * * * *